(12) United States Patent
Oren et al.

(10) Patent No.: US 8,533,044 B2
(45) Date of Patent: Sep. 10, 2013

(54) CONSIDERING USER-RELEVANT CRITERIA WHEN SERVING ADVERTISEMENTS

(75) Inventors: Ishai Oren, Tel Aviv (IS); Asaf Aharoni, Ramat Hasharon (IS); Elon Portugaly, Jerusalem (IS); Tal Perri, Tel Aviv (IS); Benny Zilberstein, Tel Aviv (IS)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 12/760,299

(22) Filed: Apr. 14, 2010

(65) Prior Publication Data
US 2011/0258035 A1      Oct. 20, 2011

(51) Int. Cl.
*G06Q 30/00*      (2012.01)
*G05B 19/418*      (2006.01)

(52) U.S. Cl.
USPC ............... 705/14.43; 705/14.42; 705/14.41

(58) Field of Classification Search
USPC ................. 705/14.42, 14.43, 14.41
See application file for complete search history.

(56) References Cited

U.S. PATENT DOCUMENTS

| | | | |
|---|---|---|---|
| 8,103,544 B2 * | 1/2012 | Mehta et al. | 705/14.42 |
| 2007/0179846 A1 * | 8/2007 | Jain et al. | 705/14 |
| 2008/0104026 A1 | 5/2008 | Koran | |
| 2008/0140508 A1 | 6/2008 | Anand | |
| 2009/0099909 A1 * | 4/2009 | Phan | 705/14 |
| 2009/0099920 A1 | 4/2009 | Aharoni | |
| 2009/0106096 A1 | 4/2009 | Horowitz | |
| 2009/0193014 A1 | 7/2009 | Nenezes | |
| 2009/0319517 A1 * | 12/2009 | Guha et al. | 707/5 |
| 2011/0218852 A1 * | 9/2011 | Zhang et al. | 705/14.43 |

OTHER PUBLICATIONS fusionOne, Nokia, AdForce, and SF Interactive Join Forces to Explore Delivery of Targeted Advertising to Mobile Devices. Business Wire, p. 0286 Mar. 27, 2000.*
Ghose, Anindya, et al., Analyzing Search Engine Advertising: Firm Behavior and Cross-Selling in Electronic Markets—Published Date: Apr. 21-25, 2008 http://www2008.org/papers/pdf/p219-ghose.pdf.
Boone, Gloria, et al., Emerging Trends in Online Advertising—Published Date: 2007 http://www.humanidades.uspceu.es/pdf/articulo1 1Emergingtrends.pdf.
Li, Ying, et al., A Markov Chain Model for Integrating Behavioral Targeting into Contextual Advertising—Published Date: Jun. 28, 2009 http://www-ai.cs.tu-dortmund.de/PROCEEDINGS/SIKDD2009/workshops/W5-adkdd09.pdf.
Chen, Ye, et al., Large-Scale Behavioral Targeting—Published Date: Jun. 28-Jul. 1, 2009 http://www.eecs.berkeley.edu/~jfc/papers/09/KDD09.pdf.

* cited by examiner

*Primary Examiner* — Victoria Vanderhorst
(74) *Attorney, Agent, or Firm* — Shook Hardy & Bacon LLP

(57) ABSTRACT

The present invention is directed to selecting an advertisement to be presented in an ad space of a webpage. A criterion (e.g., keyword, image, audio element, etc.) is selected to evoke the advertisement. In an embodiment, the criterion is selected based on a relevance of the criteria to a user, and not necessarily based solely on a relevance to the webpage. Whether a criterion should be used to evoke the advertisement might be based on various factors, such as the likelihood that the user will select a criterion-evoked advertisement, regardless of whether the criterion appears in among content of the webpage, and an expected gain of presenting the criterion-evoked advertisement.

17 Claims, 7 Drawing Sheets

CONSIDERING USER-RELEVANT CRITERIA WHEN SERVING ADVERTISEMENTS

BACKGROUND

One type of advertisement engine selects an advertisement to be presented in a fillable advertisement space of a given webpage. That is, the given webpage is designed with an empty advertisement space that is dynamically filled when the given webpage is rendered to a recipient device (e.g., client computer). Various methodologies might be employed to select an advertisement to be presented in the empty advertisement space. For example, keywords that are extracted from the given webpage might be used to evoke advertisements that are related to the keywords, such that a served advertisement might be relevant to content of the given webpage. Sometimes, a keyword of the given webpage might evoke an advertisement that is unlikely to be selected by a recipient-device user. As such, technology that selects advertisements using criteria other than keywords associated with the given webpage would be useful.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

The present invention is directed to selecting an advertisement to be presented in an ad space of a webpage. A criterion (e.g., keyword, image, audio element, webpage, search query, ad, etc.) is selected to evoke the advertisement. In an embodiment, the criterion is selected based on a relevance of the criterion to a user, and not necessarily based solely on a relevance to the webpage. For example, a criterion used to evoke the advertisement might include a keyword that is deemed relevant to a user who will view the webpage. In such an example, the keyword used to evoke the advertisement might be based on various factors, such as the likelihood that the user will select a keyword-evoked advertisement, regardless of whether the keyword appears in text of the webpage, and an expected gain of presenting the keyword-evoked advertisement.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Generally, embodiments of the present invention are directed to selecting an advertisement to be displayed on a webpage. For example, often a webpage that is to be served to a recipient device (e.g., client) includes a blank advertisement space. Prior to rendering the webpage, an advertisement server selects an advertisement to fill the blank advertisement space.

Figure 2A:
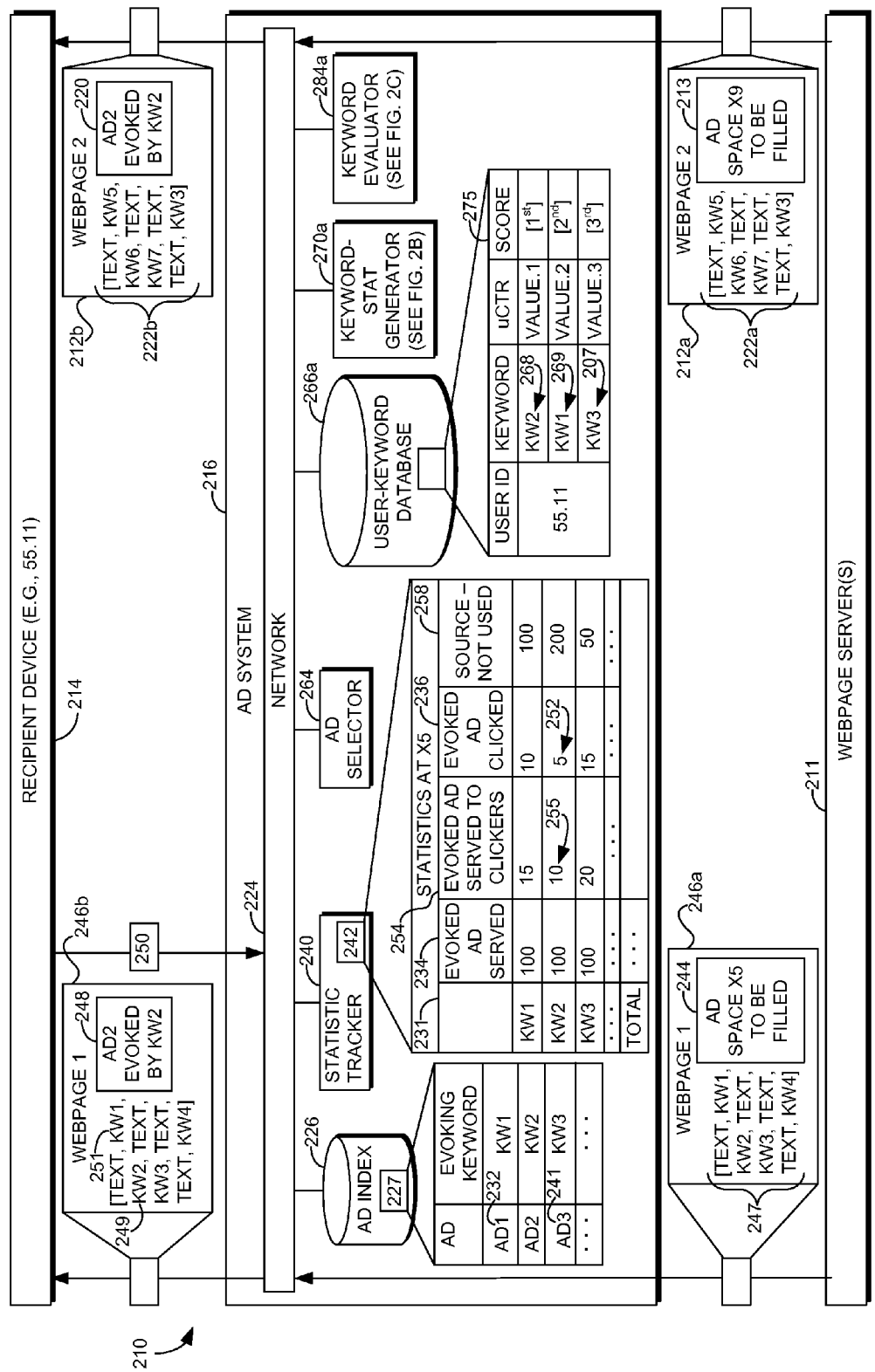
FIGS. 2a-2d are block diagrams of an exemplary operating environment in accordance with an embodiment of the present invention.
Figure 2B:
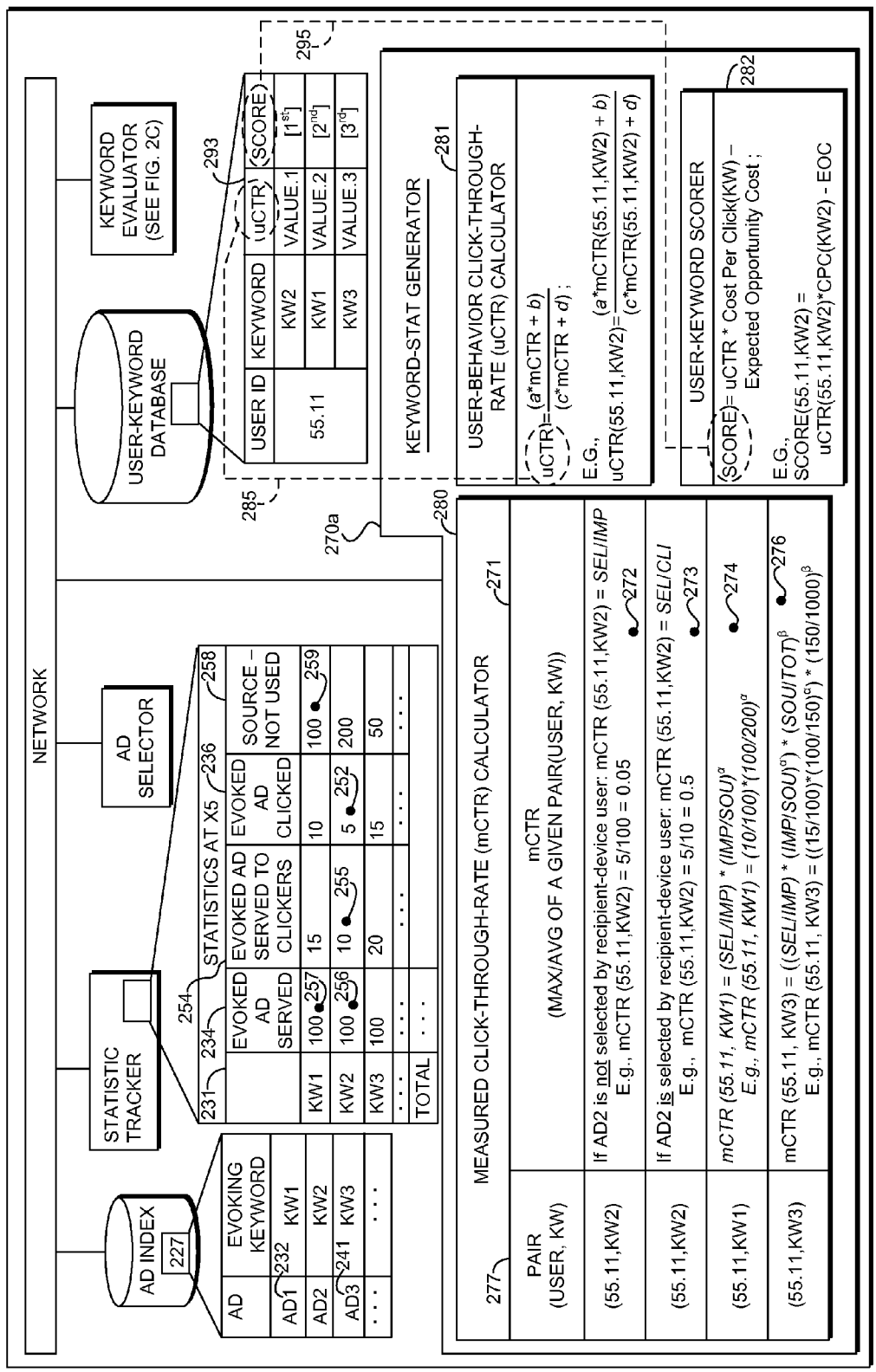
Figure 2C:
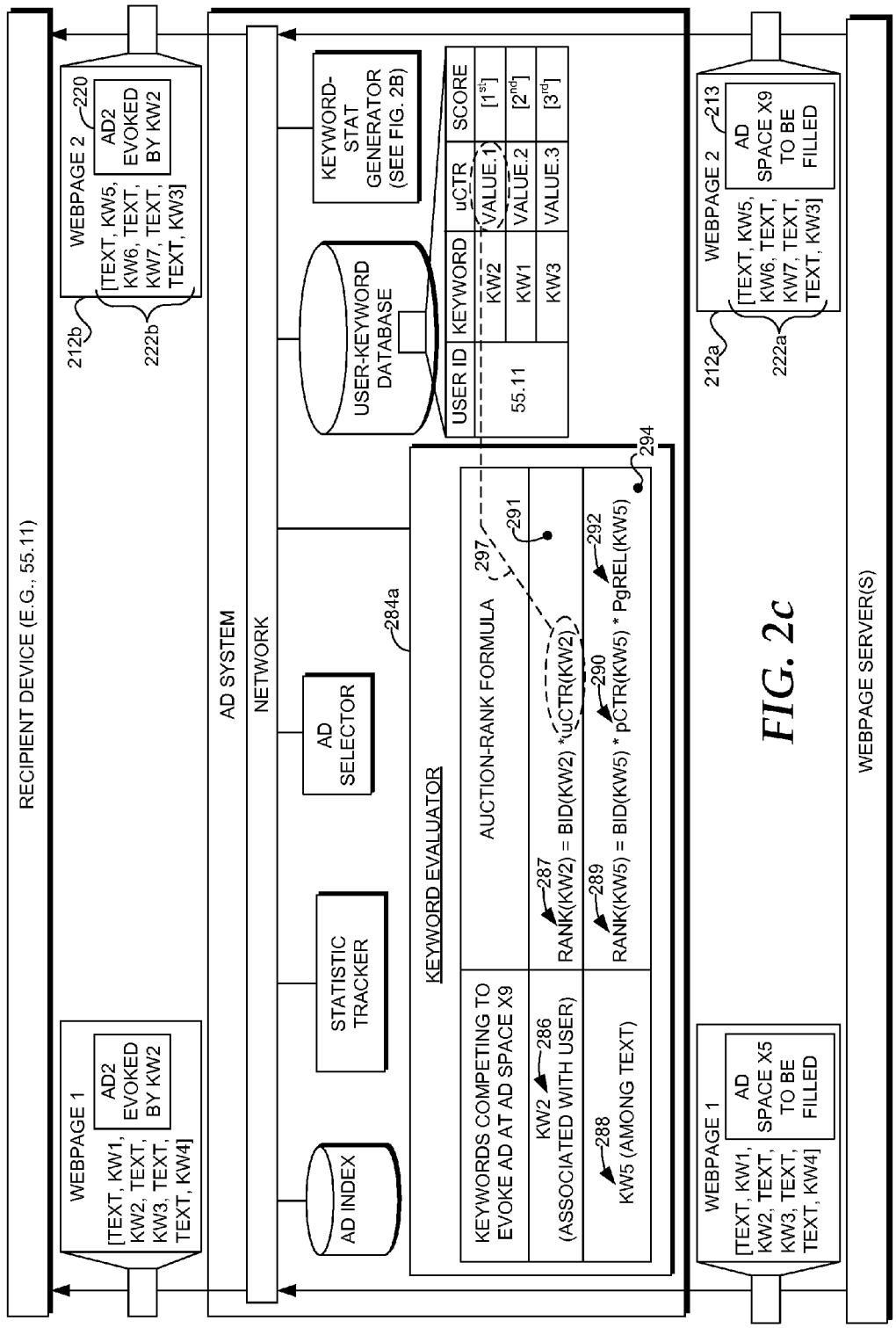
Figure 2D:
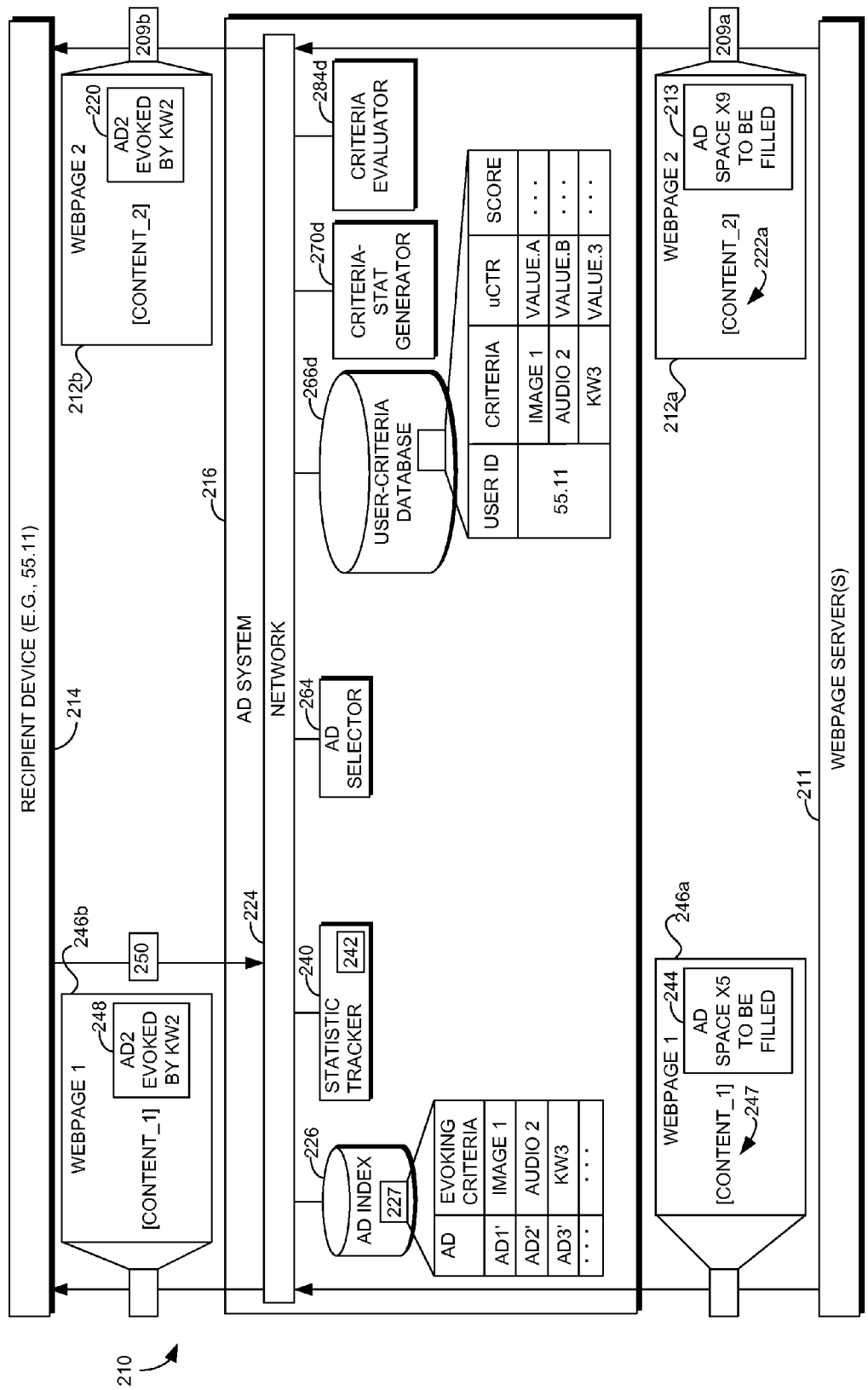

Referring to FIG. 2d, information 209a is communicated from a webpage server 211 and is depicted in an exploded view to include a webpage 212a. As depicted, webpage 212a includes a fillable ad space 213 that is identified as "ad space X9." Prior to rendering webpage 212a to a recipient device 214, an ad system 216 selects an advertisement (e.g., AD2), to be presented in ad space 213. Upon selection of an advertisement, information 209b is served to recipient device 214 and includes webpage 212b, which includes an advertisement 220 in the previously blank fillable ad space. As will be described below in more detail, in an embodiment of the present invention, a criterion that is used to evoke advertisement 220 is not necessarily included among content 222a of webpage 212a.

Figure 1:
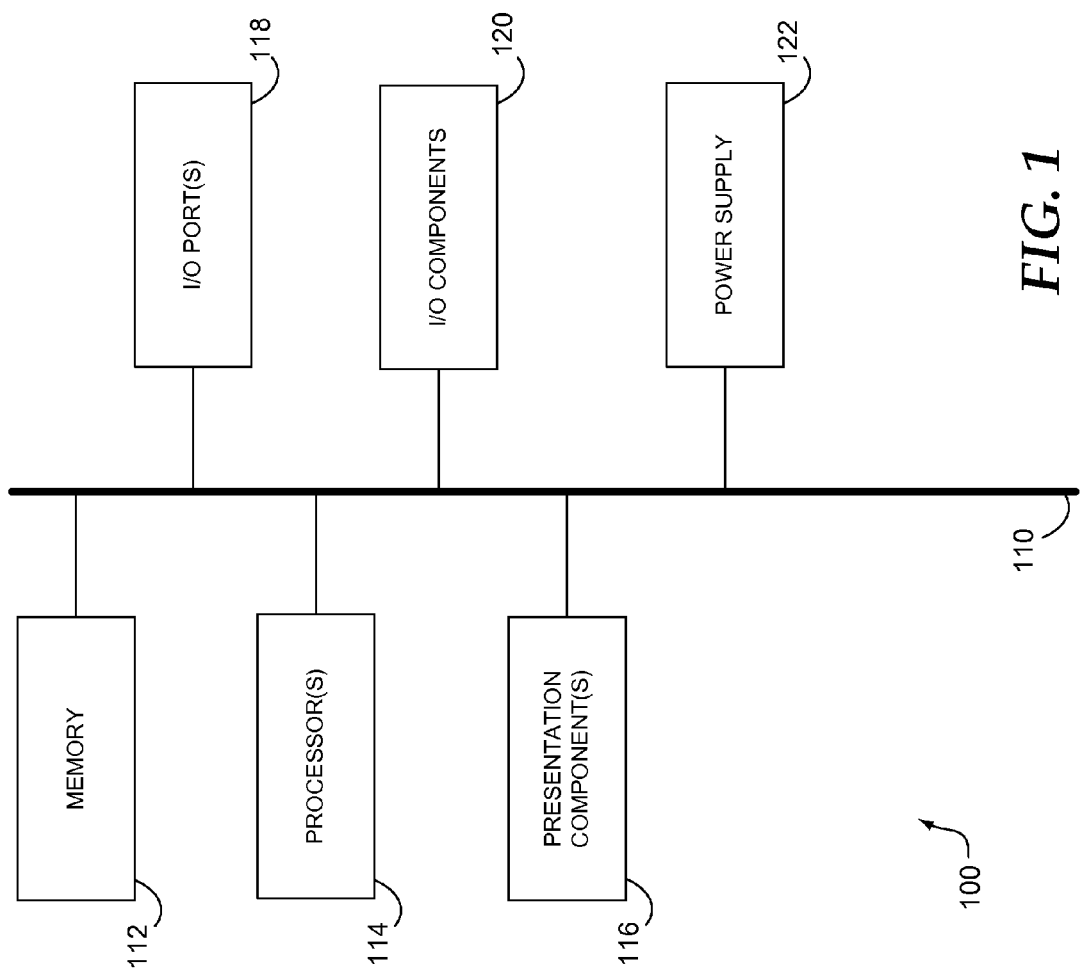
FIG. 1 is a block diagram depicting an exemplary computing device suitable for use in accordance with embodiments of the invention.

Having briefly described embodiments of the present invention, we refer now to FIG. 1 in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention might be practiced in a variety of system configurations, including handheld devices, consumer electronics, general-purpose computers, more specialty computing devices, etc. Embodiments of the invention might also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and a power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Embodiments of the present invention might be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Returning to FIG. 2d, a computing environment that includes networked components is depicted and is identified generally by reference numeral 210. Computing environment 210 includes webpage server 211, ad system 216, and recipient device 214. Components of computing environment 210 communicate to execute various functions, such as when recipient device 214 requests a webpage, which is served by webpage server 211, enhanced by ad system 216, and ultimately rendered to recipient device 214. In an embodiment of the present invention, network 224 facilitates communication with other webpage-rendering components (not shown) that perform other functions required to provide a webpage from a webpage server to recipient device 214. FIG. 2d depicts a computing environment in which various types of evoking criteria might be used to evoke an advertisement. Exemplary evoking criteria might include a keyword, an image, an audio element, and an advertisement. Other exemplary evoking criteria (not shown) might include a video, a webpage, and a search query.

Ad system 216 includes various components that communicate by way of network 224. For example, ad system 216 includes an ad index 226, which stores information 227 including advertisements to be presented in webpages rendered to recipient device 214. In one embodiment, ad selector 264 functions to select an advertisement for presentation in a fillable ad space. For example, upon receipt of webpage 246a having fillable ad space X5 244, ad selector 264 identifies a criterion (e.g., keyword, audio, image, etc.), which is usable to evoke an advertisement. As described in more detail below, criteria might be identified using various methodologies. For example, ad selector 264 might extract a keyword or an image from content 247 of webpage 246a. In such an example, when an ad to be displayed on a given webpage is evoked by a criterion that is extracted from the given webpage, the ad might be categorized as a contextual advertisement. In another example, ad selector 264 might reference criteria evaluator 284d (described in more detail below) in order to identify an evoking criterion. Once a criterion is identified, ad selector 264 references ad index 226 using the identified criterion. An advertisement that is relevant to the identified criterion is retrieved, such that the identified criterion "evokes" the advertisement. In a further embodiment, ad selector 264 provides information to statistic tracker 240 describing the advertisement selection.

In embodiments of the present invention, network (e.g., Internet) activities, such as browsing or search activities of a user of recipient device 214, are used to identify criteria that are usable at a future instant in time to evoke an advertisement of a webpage. User network activities (e.g., browsing and searching) might be tracked using various identifiers such as a machine id included in a browser cookie or a login id, which allows tracking of a user regardless of what recipient device the user is logged into. Network activities might be tracked and analyzed in a variety of ways to identify criteria that are associated with a user of recipient device 214. In one embodiment, criteria are identified when a webpage or search-results page (also referred to as "SRP") having a criteria-evoked advertisement is rendered to recipient device 214. For example, criteria that are identified might include any criterion that evokes an advertisement; any criterion that was a source of a potential advertisement, regardless of whether the potential advertisement was ultimately evoked; and any criterion that is included in a webpage, but that was not evaluated to potentially evoke an advertisement. In this respect, embodiments of the present invention recognize that while a criterion might not be used to evoke an advertisement, which is presented to a user, the criterion might still be relevant to the user when future advertisement opportunities arise.

In another embodiment, criteria are identified throughout a defined period of time. For example, criteria might be identified based on all browsing or search activities of recipient device 214 taking place in the course of one day, one week, or any other desired period of time. Alternatively, criteria might be identified until a defined number of criteria is identified. For example, criteria might be identified from network activities until one hundred criteria have been identified. In another embodiment, a number of criteria to be identified is based on a combination of a defined number and a defined time duration. For example, criteria might be identified until the earlier of one-hundred criteria are identified or network activities have been tracked for one week. As such, in various embodiments of the present invention, because multiple criteria are identified, the criteria are evaluated and compared to one another to identify a criterion that is deemed most desirable. A criterion might be deemed most desirable if the criterion evokes valuable advertisements (e.g., advertisements that are likely to be selected by a recipient device user).

In a further embodiment of the present invention, criteria that have been identified from network activities of recipient device are scored, thereby enabling criteria ranking and identification of most favorable criteria. For example, as described in more detail below, a criteria score might be determined using statistics maintained in statistic tracker 240. Moreover, a criteria score might depend on other factors, such as whether a criterion was a source of a potential advertisement, whether a criterion was used to evoke an advertisement, and, if the criterion was used to evoke an advertisement, whether the advertisement was selected.

Accordingly, an embodiment of the present invention includes statistic tracker 240, which tracks statistics 242 related to a criterion and a fillable advertisement space (e.g. ad space X5 244). As will be described in more detail below, statistics 242 are usable by criteria-stat generator 270*d* to calculate values associated with a given criterion. For example, using values collected by statistic tracker 240, criteria-stat generator 270*d* quantifies a relevance of a given criteria to a user. In embodiments of the present invention, a relevance of a criterion to a user indicates an association strength of the criterion to the user, the association strength sometimes influencing the likelihood that the user will select an advertisement evoked by the criterion. In this respect, a higher relevance of a criterion to a user suggests a higher likelihood that the user will select an ad evoked by the criterion, as compared to a different criterion with a lower relevance to the user. Embodiments of the present invention utilize different measures of relevance. For example, a contextual relevance suggests an association strength between a user and a criterion that is determined in a context of when the criterion is served to the user, such as when the criterion is served among content of a webpage. Another type of relevance includes learned relevance, which suggests an association strength between a user and a criterion that is recognized (e.g., by using a machine learning algorithm) based on an aggregation of contextual-relevance values.

In embodiments of the invention, values calculated by criteria-stat generator 270*d* are stored in user-criteria database 266*d* and are usable by criteria evaluator 284*d* to determine whether a given criterion should be used to evoke an advertisement. For example, criteria evaluator 284*d* might facilitate an auction between various criteria using values calculated by criteria-stat generator 270*d*.

Referring now to FIG. 2*a*, an embodiment of the present invention is depicted in which a keyword is used as a criterion to evoke an advertisement. FIG. 2*a* depicts a version of the environment depicted in FIG. 2*d* in which some elements are more specifically depicted to evaluate a keyword as a type of criterion. For example, user-keyword database 266*a* of FIG. 2*a* is a specific version or type of a user-criteria database 266*d* of FIG. 2*d* because a keyword is one type of criterion. Accordingly, user-keyword database 266*a* might be one of many databases within user-criteria database 266*d* Likewise, keyword-stat generator 270*a* and keyword evaluator 284*a* are specific types of (and might be sub-components of) criteria-stat generators and criteria evaluators, respectively.

In one embodiment, an exemplary statistical category includes a number of times an advertisement evoked by a particular keyword is presented to any user of any recipient device in a particular fillable advertisement space (e.g., ad space 244 of webpage 246*a* identified as "ad space X5"). That is, in the course of a period of time (e.g., 1 day) a particular webpage (e.g., webpage 246*a*) having a fillable advertisement space (e.g., ad space X5 244) might be rendered 1000 times total to 750 different recipient devices. Of those 1000 renderings, an advertisement evoked by a particular keyword (e.g., AD2 248 evoked by KW2) might be presented in the fillable advertisement space a total of 100 times. In this example, during those 900 other renderings, one or more different advertisements (e.g., AD1 232 and AD3 241) might have been presented in the fillable advertisement space. In FIG. 2*a*, column 234 is identified as "Evoked Ad Served" and records a number of times a keyword-evoked advertisement (e.g., AD2 248) is presented in ad space X5 244. As indicated above, upon selection of an advertisement to be presented in a fillable ad space, ad selector 264 notifies statistic tracker of the selection, thereby allowing statistic tracker 240 to update information under column 234.

Another exemplary statistical category (depicted under column 236 titled "Evoked Ad Clicked") includes a number of times an advertisement (e.g., AD2 248), which is evoked by a particular keyword, is selected by any recipient-device user when the advertisement is presented in a particular advertisement space (e.g., ad space X5 244). In embodiments of the present invention a recipient-device user might "select" an advertisement in various ways, such as by clicking the advertisement with an input device (e.g., mouse, touch surface, etc.). In an embodiment of the present invention, feedback 250 is provided, either expressly or inherently, from recipient device 214 to ad system 216. For example, feedback 250 might be triggered by a selection of an advertisement (e.g., AD2 248) by a recipient-device user. Alternatively, feedback 250 might be inherently provided when an advertisement (e.g., AD2 248) is not selected on a webpage (e.g., webpage 246*b*), such as when a recipient-device user navigates away from the webpage (e.g., webpage 246*b*) without selecting the advertisement (e.g., AD2 248). In an exemplary embodiment, if webpage 246*b* is presented with AD2 248 (evoked by KW2) one-hundred times total to various recipient devices, AD2 248 might be selected five times, as reflected by information 252. Of those 100 impressions, some might be presented to the same recipient device more than once. Alternatively, each of the 100 impressions might be unique (i.e., presented to 100 different recipient devices). Moreover, each of the five selections might have been executed by five different recipient-device users, or alternatively, a recipient-device user might have executed multiple of the five selections.

Another exemplary statistical category (depicted under column 254 titled "Evoked Ad Served to Clickers") includes a number of times an advertisement, which is evoked by a particular keyword, is served in a particular fillable advertisement space to any user that selected (e.g., clicked) the advertisement. For example, an advertisement evoked by KW2 (e.g., AD2 248) might have been selected five times total by three different users when served with webpage 246*b* in ad space X5 244. However, AD2 248 might have actually been served in ad space X5 244 ten times total to those three different users. In this case, as reflected by information 255, ten is the number of times AD2 248 is served in ad space X5 244 to any user that selected AD2 248.

Another exemplary statistic (depicted under column 258 titled "Source—not used") includes a number of times a keyword was a source of a potential keyword-evoked advertisement, which was not selected to be presented at a particular ad space (e.g., ad space X5 244). For example, KW1 is included among text 247 of webpage 246*a*, such that KW1 might have been source to evoke AD1 232. However, as depicted by webpage 246b, AD1 232 was not selected to be presented at ad space X5 244. In one embodiment, a keyword is "available to evoke" an advertisement to be presented with a webpage when the keyword is included among text of the webpage. A keyword that is available to evoke an advertisement might not be used to evoke the advertisement at the specified ad space for a variety of reasons. For example, an advertisement might not be located or the keyword might not be deemed as favorable as a different keyword. Alternatively, the keyword might be used to evoke an ad that is rendered in a different ad space. That is, a keyword is a "source" of an advertisement when the keyword is evaluated (e.g., by ad selector 264 or keyword evaluator 290) to potentially evoke an advertisement, regardless of whether or not the keyword is ultimately used to evoke an advertisement. On the other hand, a keyword is not deemed a source where the keyword is available (e.g., in the webpage text) but is not evaluated to potentially evoke an advertisement.

In embodiments of the present invention, network (e.g., Internet) activities, such as browsing or search activities of a user of recipient device 214, are used to identify a user keyword that is relevant to a user and that usable at a future instant in time to evoke an advertisement. For example, KW2 268, which is associated with a user in user-keyword database 266a and has been deemed relevant to the user, might be used to evoke AD2 220 in webpage 212b, even though KW2 268 is not included within text 222a. User network activities (e.g., browsing and searching) might be tracked using various identifiers such as a machine I.D. included in a browser cookie or a login I.D., which allows tracking of a user regardless of what recipient device the user is logged into.

Network activities might be tracked and analyzed in a variety of ways to identify user keywords (e.g., KW1 269) that are associated with a user of recipient device 214. In one embodiment, a user keyword is identified when a webpage or search-results page (also referred to as "SRP") having a keyword-evoked advertisement is rendered to recipient device 214. For example, webpage 246b that is rendered to recipient device 214 includes AD2 248 evoked by KW2. As such, various user keywords might be identified from webpage 246b, including any keyword that was used to evoke an advertisement of webpage 246b (there might be other keyword-evoked advertisements in addition to AD2 248); any keyword that was a source of a potential advertisement, regardless of whether the potential advertisement was ultimately evoked; and any keyword that is included in webpage 246b, but that was not evaluated to potentially evoke an advertisement. Referring to webpage 246b, KW2 is a user keyword as KW2 evoked AD2 248. In addition, KW1, KW3, and KW4 are also user keywords. In this respect, embodiments of the present invention recognize that while a keyword might not be used to evoke an advertisement, which is presented to a user, the keyword might still be relevant to the user when future advertisement opportunities arise.

In another embodiment, user keywords are identified throughout a defined period of time. For example, user keywords might be identified based on all browsing or search activities of recipient device 214 taking place in the course of one day, one week, or any other desired period of time. Alternatively, user keywords might be identified until a defined number of user keywords are identified. For example, user keywords might be identified from network activities until one hundred user keywords have been identified. In another embodiment, a number of user keywords to be identified is based on a combination of a defined number and a defined time duration. For example, user keywords might be identified until the earlier of one-hundred user keywords are identified or network activities have been tracked for one week. As such, in various embodiments of the present invention, because multiple user keywords are identified, the user keywords are evaluated to identify a user keyword that is deemed most desirable. A user keyword might be deemed most desirable if the user keyword evokes valuable advertisements (e.g., advertisements that are likely to be selected by a recipient device user).

In a further embodiment of the present invention, user keywords that have been identified from network activities of recipient device are scored, thereby enabling user-keyword ranking and identification of most favorable user keywords. For example, as described in more detail below, a user-keyword score (e.g., stored under column 275) might be determined using statistics maintained in statistic tracker 240. Moreover, a user-keyword score might depend on other factors, such as whether a keyword was a source of a potential advertisement, whether a keyword was used to evoke an advertisement, and, if the keyword was used to evoke an advertisement, whether the advertisement was selected.

In an additional embodiment of the present invention, a user-keyword score is based, at least in part, on a measured click-through-rate (mCTR). An mCTR is a value that quantifies a relevance (e.g., contextual relevance) of the user keyword as the user keyword relates to a recipient-device user in a context of when a webpage including a keyword-evoked ad is served to the recipient device, the keyword typically extracted from the webpage content. For example, when webpage 246b is served with AD2 248 to recipient device 214, an mCTR of KW2 249 quantifies a relevance of KW2 249 to a recipient-device user in the context of when webpage 246b is served with AD2 248. Likewise, when webpage 246b is served with AD2 248 to recipient device 214, a different mCTR of KW1 251 quantifies a relevance of KW1 251 to a recipient-device user in the context of when webpage 246b is served with AD2 248. In an embodiment of the present invention, an mCTR quantifies a contextual relevance of a criterion to a user as the mCTR suggests an association strength between a user and a criterion that is determined in a context of when the criterion is served to the user, such as when the criterion is served among content of a webpage. In a further embodiment of the present invention, a keyword-stat generator 270a functions to calculate an mCTR of a given user keyword. An exemplary keyword-stat generator 270a is depicted in more detail in FIG. 2b and includes an mCTR calculator 280. In an embodiment of the present invention, calculation of an mCTR of a user keyword depends on whether the user keyword was a source of a potential advertisement; whether a keyword was used to evoke an advertisement; and, if the keyword was used to evoke an advertisement, whether the advertisement was selected.

In FIG. 2b, column 271 under mCTR calculator 280 depicts various formulas that might be used to calculate an mCTR of a user-keyword pairing, depending on how the keyword relates to an advertisement that was rendered to recipient device. That is, the various formulas might be used to calculate an mCTR of a given user keyword as the given user keyword relates to a recipient-device user when the particular recipient-device user engages in network activity that exposes the user to the user keyword. Exemplary pairings are depicted under column 277 that were generated based on rendering webpage 246b (FIG. 2a), which included KW1, KW2, and KW3, to recipient device 214. Recipient device 214 is identified by "55.11." Pairs listed under column 277 include (i.e., are specific to) a user and a keyword (e.g., 55.11 and KW2) because the mCTR quantifies a relevance of the keyword to the user. Under column 277, pair 55.11 and KW2 are listed twice because the mCTR value of KW2 as it relates to 55.11 depends on whether an advertisement evoked by KW2 was selected by 55.11.

As depicted in field 272 under mCTR calculator 280, when an advertisement that is evoked by a particular keyword and that is presented in a particular fillable ad space (e.g., in FIG. 2a AD2 248 of webpage 246b presented in ad space X5 244) is not selected by a recipient-device user, the mCTR of the user-keyword pairing (e.g., user 55.11 and KW2) is represented by a ratio: (SEL/IMP). In an embodiment of the invention "SEL" is a number of times the keyword-evoked advertisement (e.g., AD2 248) is selected by any user of any recipient device when the keyword-evoked advertisement (e.g., AD2 248) is served in the particular ad space (e.g., ad space X5 244). In a further embodiment, IMP is a number of times the keyword-evoked advertisement (e.g., AD2 248) is served, regardless of whether it is selected, to any recipient device in the particular fillable ad space (e.g., ad space X5 244). According to an example provided by FIG. 2b, SEL of KW2 at ad space X5 is five, as depicted in field 252, i.e., an ad evoked by KW2 was selected a total of five times by any user of any recipient device when the ad evoked by KW2 was served in ad space X5 244. Moreover, IMP of KW2 at ad space X5 is 100, as depicted in field 256, i.e., an ad evoked by KW2 was served in ad space X5 to any recipient device a total of 100 times. As such, in the example provided by FIG. 2, when AD2 248 (FIG. 2a) is not selected, an mCTR (55.11, KW2) is equal to 0.05.

Field 273 under mCTR calculator 280 depicts when an advertisement that is evoked by a keyword and that is presented in a particular fillable ad space (e.g., AD2 248 of webpage 246b presented in ad space X5 244) is selected by a recipient-device user, the mCTR of the user-keyword pairing is represented by a ratio: (SEL/CLI). As previously described, in an embodiment of the invention "SEL" is a number of times the keyword-evoked advertisement (e.g., AD2 248) is selected (e.g., clicked) by any user of any recipient device when the keyword-evoked advertisement (e.g., AD2 248) is served in the particular ad space (e.g., ad space X5 244). In a further embodiment, CLI is a number of times the keyword-evoked advertisement (e.g., AD2 248) is served at the ad space to all users that selected the keyword-evoked advertisement (e.g., AD2 248). According to an example provided by FIG. 2b, SEL of KW2 at ad space X5 is five (as depicted in field 252), i.e., an ad evoked by KW2 was selected a total of five times by any user of any recipient device when the ad evoked by KW2 was served in ad space X5 244. Moreover, CLI of KW2 at ad space X5 is ten, as depicted in field 255, i.e., an ad evoked by KW2 was served to all recipient devices that selected the ad evoked by KW2 a total of 10 times.

Field 274 of mCTR calculator 280 depicts that when a keyword-evoked advertisement presented in a particular fillable ad space (e.g., AD2 248 of webpage 246b presented in ad space X5 244) is not evoked by a user keyword (e.g., KW1), but the user keyword (e.g., KW1) was a source to the ad selector, which is able to evoke an advertisement (perhaps evoking an alternative advertisement, such as AD1), the mCTR of the user-keyword pairing (e.g., 55.11 and KW1) is calculated using a formula represented by: mCTR=(SEL/IMP)*(IMP/SOU)$^\alpha$. In an embodiment, (SEL/IMP) is as described herein above; and "SOU" is equal to the number of times the user keyword (e.g., KW1) was a source to evoke the alternative advertisement (e.g., AD1), regardless of whether the alternative advertisement (e.g., AD1) was served. Moreover, "$\alpha$" is a parameter that is learned by the system. In one embodiment, $\alpha$ includes a default value. In one embodiment, the default value is 0.5. In an example provided in FIG. 2b, SEL/IMP of KW1 is 0.1 (i.e., 10/100) and IMP of KW1 is 100 (as depicted in field 257), Moreover, SOU of KW1 is 200 (as depicted by combination of fields 257 and 259), i.e., KW1 was a source to evoke an alternative advertisement 200 times, 100 of which the alternative advertisement was evoked.

Field 276 of mCTR calculator 280 depicts that when a keyword-evoked advertisement presented in a particular fillable ad space (e.g., AD2 248 of webpage 246b presented in ad space X5 244) is not evoked by a user keyword (e.g., KW3) and the user keyword was not a source to evoke an alternative advertisement (e.g., AD3), the mCTR is calculated using a formula represented by: mCTR=((SEL/IMP)*(IMP/SOU)$^\alpha$)* (SOU/TOT)$^\beta$. As described above, a keyword is not a source to evoke an advertisement when the keyword is not evaluated (e.g., entered into an auction) to be selected to evoke an advertisement. In an embodiment of the present invention, ((SEL/IMP)* (IMP/SOU)$^\alpha$) and SOU are as described above with respect to field 274. In a further embodiment, TOT is equal to a number of times the fillable advertisement space was served to any user of any recipient device and $\beta$ is a parameter that is learned. In one embodiment, $\beta$ includes a default value. In one embodiment the default value is 0.5. For example, TOT might be determined for a given time period (e.g., one week or whatever duration is required to identify a defined number of user keywords) during which browsing activity is being monitored. In the example provided in FIG. 2b, ad space X5 was served 1000 times total to any user of any recipient device, such that the mCTR of the pair (55.11, KW3) is equal to ((15/100)*(100/150)$^\alpha$)*(150/1000)$^\beta$.

In an embodiment of the present invention, formulas (such as those depicted in fields 272, 273, 274, and 276) that are used to determine an mCTR value either discount or enhance a base mCTR value. For example, a base mCTR might be established in situations in which a user is exposed to a keyword-evoked advertisement but does not select the keyword evoked advertisement. An assumption might be made that users that are exposed to a particular keyword-evoked ad at a particular advertisement space share a similar predisposition to that particular keyword. In an embodiment of the present invention, the ratio (SEL/IMP) establishes a base mCTR value. The base mCTR might be enhanced to describe users that selected the advertisement. That is, by enhancing the base mCTR value a stronger relevance might be predicted between a user and a keyword that evoked the selected advertisement. In an embodiment of the present invention, a formula that enhances the mCTR value includes (SEL/CLI). Moreover, the base mCTR might be discounted in situations where a user is not exposed to a keyword-evoked ad, but the keyword was a source to evoke an advertisement. In an embodiment, a formula that discounts the mCTR value includes: (SEL/IMP)*(IMP/SOU)$^\alpha$. Furthermore, the base mCTR might be further manipulated to account for situations in which a keyword is not even a source of a potential advertisement, such that a formula that further manipulates the mCTR includes ((SEL/IMP)*(IMP/SOU)$^\alpha$)*(SOU/TOT)$^\beta$.

In a further embodiment of the present invention, other factors might be taken into consideration when calculating an mCTR of a given user-keyword pairing. For example, if an advertisement evoked by a particular keyword was presented in a fillable ad space that is less prominently positioned (e.g., lower on a webpage), the mCTR of that user-keyword pairing might be enhanced (as the position already figured in a discount). In this manner, the mCTR formula takes into account inferences that might be drawn regarding relevance of a user keyword, i.e., a user keyword might be given a higher mCTR if it was used to evoke an advertisement at a less desirable fillable ad space.

In further embodiments, a user might navigate to a webpage more than once, or might navigate to multiple webpages that include a same keyword, such that multiple mCTRs of a given user-keyword pair are generated. For example, if recipient device 214 navigates to webpage 212b on multiple occasions during a time period when navigation is being tracked, content including KW5 will have been rendered to recipient device 214 more than once, such that multiple mCTRs related to the pair (55.11, KW5) might be calculated. In one embodiment, the highest mCTR of a given user-keyword pair is selected as a final mCTR of the given user-keyword pair. Alternatively, an average mCTR of all mCTR values is utilized as a final mCTR of the given user-keyword pair.

In a further embodiment, the mCTR value of a user-keyword pair is used to predict whether an advertisement served with a webpage will be selected by a recipient-device user when the advertisement is evoked by the user keyword. For example, in one embodiment, an mCTR is used to calculate a user-behavior text-independent click-through-rate (hereinafter "uCTR"). In an embodiment, a uCTR quantifies a learned relevance, which suggests an association strength between a user and a criterion that is recognized (e.g., by using a machine learning algorithm) based on one or more measured or observed statistics. An example of measured statistics includes an aggregation of contextual-relevance values. In a further embodiment, a uCTR of a given user-keyword pairing might be determined by applying a link function to one or more mCTR values. In one embodiment, uCTR is calculated by using a Mobius transformation, such that the formula $(az+b)/(cz+d)$ is applied to one or more mCTR values, wherein a, b, c, and d are learned parameters and z is the mCTR of the given user-keyword pairing. For illustrative purposes, FIG. 2b includes a uCTR calculator 281, which determines a uCTR of a pairing. In a further embodiment, inferences are drawn from a uCTR of a given pairing as to whether an advertisement served with a webpage will be selected by a recipient-device user when the advertisement is evoked by the user keyword, which is not included among text of the webpage. Once a uCTR has been determined, the uCTR is associated with the user-keyword pairing, such as in user-keyword database 266a under column 293. For example, line 285 illustrates that information generated by uCTR calculator 281 is communicated to user-keyword database 266a.

Moreover, the uCTR is utilized in other respects to evaluate a given user-keyword pairing. For example, as described above, user keywords are scored to enable user-keyword ranking and identification of most favorable user keywords. In one embodiment, keyword-stat generator 270a includes a user-keyword scorer 282, which further processes a uCTR to determine a keyword score and to assess a value of serving a given user an advertisement evoked by a particular keyword. In one embodiment, to determine a keyword score, a uCTR is multiplied by a cost-per-click value (also referred to as "CPC") (i.e., an expected cost-per-click of a keyword-evoked advertisement), the product of which is reduced by an expected opportunity cost (also referred to as "EOC") of not serving an advertisement evoked by a webpage keyword, which is included among text of the webpage. In a further embodiment, the product might be multiplied by 1000 to translate the product to a cost-per-mille value. By multiplying a uCTR by CPC, and reducing the product by an EOC, an expected net gain (also referred to as "ENG") value is inferred, i.e., an expected net gain of serving to a particular user a webpage with an advertisement evoked by a given keyword, which is not included among text of the webpage. In one embodiment, the ENG of a user-keyword pairing is utilized as a keyword score to compare the user-keyword pairing to other user-keyword pairings. Such a comparison might be most appropriate where keywords are equally likely to evoke an advertisement. In such an embodiment, the invention essentially compares the ENG of one pairing against the ENG of an alternative pairing to determine which pairing is more favorable. In a further embodiment, where user keywords are not equi-likely to evoke an advertisement, the expected-net-gain value is multiplied by an expected number of impressions, which might be user dependent. Once a score has been determined, the score is associated with the user-keyword pairing, such as in user-keyword database 266a. For example, line 295 illustrates that information generated by user-keyword scorer 282 is communicated to user-keyword database 266a.

Referring to FIG. 2a, KW2, KW1, and KW3, which are stored in user-keyword database 266a, have been scored and ranked from a most favorable value to a least favorable value. KW2, KW1, and KW3 have been associated with a user (i.e., 55.11), and KW2 has been identified as a user keyword that has a favorable expected value (e.g., ENG reflected by favorable score) and that might be selected by a recipient-device user (e.g., as suggested by uCTR). In one embodiment, the aggregation and scoring of user keywords is performed offline, thereby creating a list of user keywords that might be loaded as an active file at runtime. For example, upon receiving webpage 212a, which is to be rendered to recipient device 214, a determination is made that ad space X9 213 should be filled. As previously described, when selecting an advertisement to be presented in ad space X9 213, keywords are identified that might be used to evoke the advertisement. In one embodiment, to identify keywords the list of user keywords in the active file is referenced, thereby retrieving keywords that might not be included in among text 222a of webpage 212a.

In a further embodiment, upon identification of keywords that are usable to evoke an advertisement (e.g., AD2 220) to be presented in ad space X9 213, an auction is held to determine which of the keywords should be used to evoke the advertisement. Referring to FIGS. 2a and 2c, a keyword evaluator 284a is depicted in more detail and depicts how an auction might be performed to select an advertisement to be presented in a target webpage. In one embodiment, keyword evaluator 284a compares one or more keywords (e.g., KW2 286) that have been previously associated with a user and one or more keywords (e.g., KW5 288) or other criterion that are included among the text, such that a keyword that is ultimately selected to evoke an advertisement is not necessarily included among the text. That is, the one or more keywords that have been previously associated with a user are not required to be included among the text, although they might be included among the text. In a further embodiment a respective auction rank (e.g., ranks 287 and 289) is calculated for each of the keywords.

For example, an auction rank of the keyword (e.g., KW5) included in the text (e.g., text 222a) might be determined based, at least in part, on a predicted click-through-rate (pCTR) (e.g., 290) and a keyword-to-page relevance score (e.g., 292). A pCTR is a value that suggests a general relationship between a keyword and a particular ad, e.g., pCTR value suggests average rate at which advertisements evoked by the keyword are clicked. A pCTR value does not take into consideration a relevance of a keyword to a particular user and does not take into account a relevance of a keyword to a webpage. On the other hand, a keyword-to-page relevance score (also referred to as "PgREL") is a factor that takes into account a relevance of a keyword to a webpage, such that keywords more germane to a main subject of a webpage have a more favorable keyword-to-page relevance score. As such, in an embodiment of the present invention, an auction rank of a keyword that is included among text of a webpage is determined by applying a formula represented by: auction rank (contextual keyword)=bid*pCTR* PgREL. Such an embodiment is depicted in field 294 of keyword evaluator 284a.

In a further embodiment of the present invention, the value uCTR/pCTR is associated with the user-keyword pair to fill in for the page-keyword relevance (PgREL), so that an auction rank of a keyword that has been previously associated with a user and that is not necessarily included among text of a webpage is determined by applying a formula represented by: auction rank(user-associated keyword)=bid*pCTR* (uCTR/pCTR). In such an auction-ranking formula, the pCTR is canceled and the auction rank is equal to the product of a bid and a uCTR value. Such an embodiment is depicted in field 291 of keyword evaluator 284a. Line 297 depicts the uCTR value being used in an auction-ranking formula.

In an alternative embodiment, a keyword or other evoking criterion might have been previously associated with a user and might also be included among text of a webpage, such that an alternative auction-ranking formula is applied in which the uCTR, the pCTR, and the PgREL are all considered when determining whether to use the keyword to evoke an advertisement. For example, KW3 207 is associated with user 55.11 in user-keyword database 266a and KW3 is also included among text 222a of webpage 212a, such that both the relevance of KW3 to user 55.11 and the relevance of KW3 to webpage 212a might be taken into consideration when determining whether KW3 should be used to evoke an advertisement.

In an embodiment of the present invention, a keyword that enters an auction and is determined to have the most favorable auction rank is selected as a keyword to evoke an advertisement. For example, if KW2 enters an auction and is determined to have a most favorable auction rank, KW2 is used to evoke an advertisement. Such an exemplary scenario is depicted by webpage 212b, which includes AD2 220 evoked by KW2.

Figure 3:
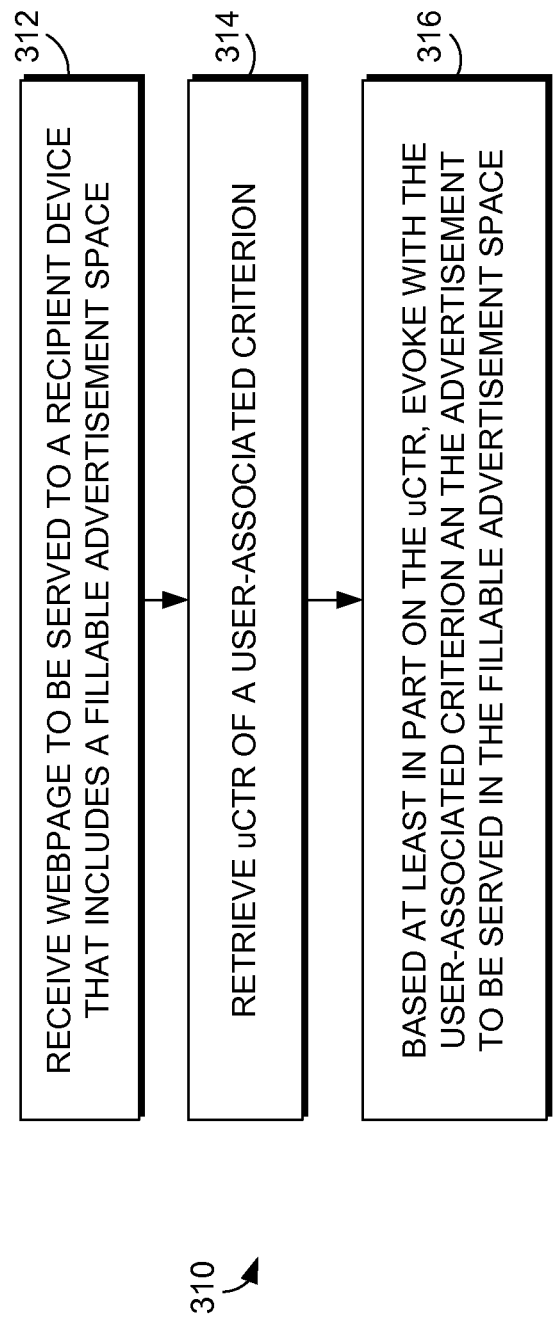
FIGS. 3 and 4 are exemplary flow diagrams in accordance with an embodiment of the present invention.

Referring to FIG. 3, an embodiment of the present invention is directed to one or more computer-readable media having computer-executable instructions embodied thereon that, when executed, cause a computing device to perform a method (identified generally by reference numeral 310) of selecting an advertisement to be displayed on a webpage. In describing method 310, reference is made to FIGS. 2a-2d for exemplary purposes. Method 310 includes receiving 312 the webpage (e.g., webpage 212a of FIG. 2d) that is to be served to a recipient device and that includes a fillable advertisement space (e.g., ad space X9 213), wherein the webpage includes a current-webpage criterion among content (e.g., text 222a) of the webpage. A current-webpage criterion might include various elements that are included among content of the webpage and that are usable to evoke an advertisement. Exemplary current-webpage criteria include a keyword, an image, an audio element, a video, an advertisement, and a search query.

At step 314, a user-behavior click-through-rate (uCTR) of a user-associated criterion (e.g., keyword, image, video, audio, ad, search query, etc.) is retrieved, the user-associated criterion being previously available to evoke a prior advertisement that was previously served to a user of the recipient device, wherein the uCTR quantifies a relevance of the user-associated criterion to the user. A uCTR might be retrieved from a user-criteria database. Moreover, a uCTR might be retrieved from an active file that includes a set of uCTRs, which are ranked to identify one or more user-associated criteria that are desirable to evoke an advertisement.

Step 316 includes, based at least in part on the uCTR, evoking with the user-associated criterion, instead of the current-webpage criterion, the advertisement to be served in the fillable advertisement space.

Figure 4:
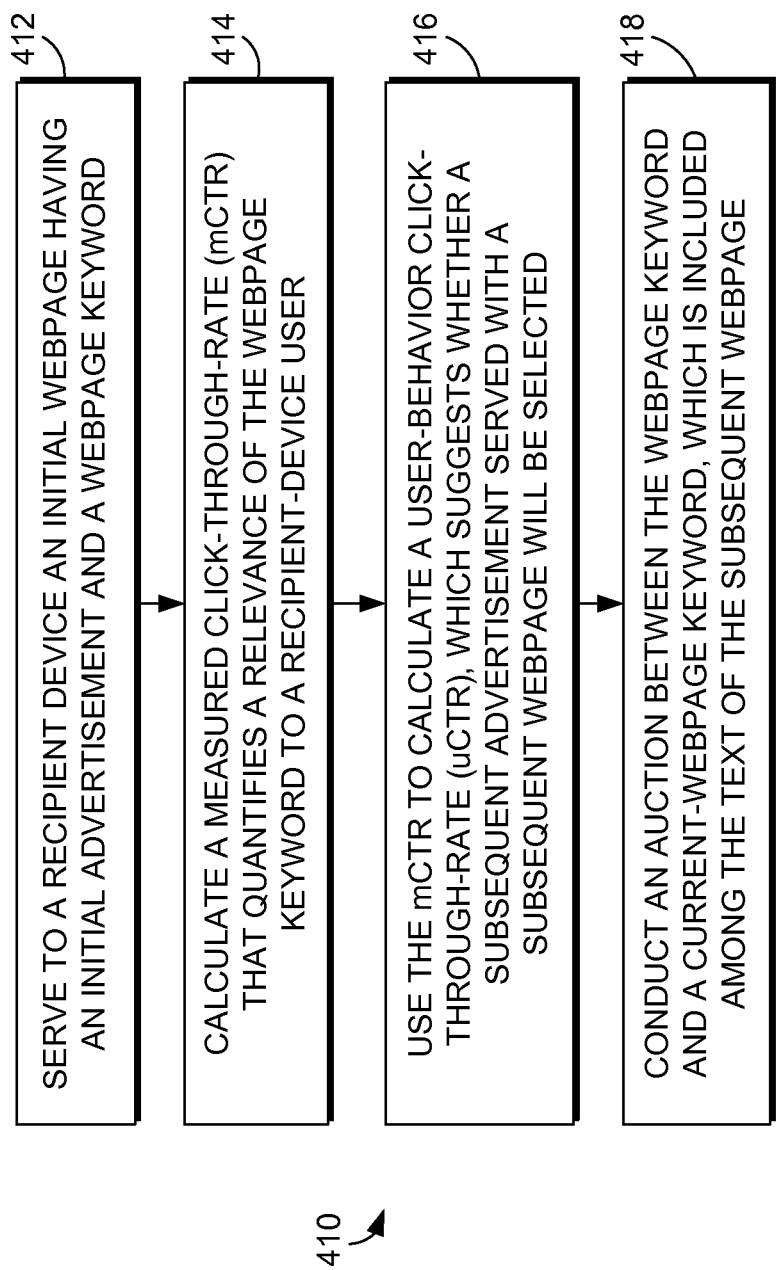

Referring to FIG. 4, another embodiment is directed to a method (identified generally by reference numeral 410), which is facilitated by a processor and computer-readable media, of selecting an advertisement to be displayed on a webpage. The method 410 includes at 412, serving to a recipient device an initial webpage (e.g., webpage 246b of FIG. 2a) having an initial advertisement (e.g., AD2 248) and a webpage keyword (e.g., KW2), which is included among text (e.g., text 247) of the initial webpage, wherein the initial advertisement is served in an initial fillable advertisement space. Step 414 includes calculating a measured click-through-rate (mCTR) that quantifies a relevance of the webpage keyword (e.g., KW2) to a recipient-device user in a context of when the initial webpage (e.g., webpage 246b) is served. For example, KW2 249 might be identified among text of webpage 246b, such that keyword-stat generator 270a calculates an mCTR of KW2 249 using an appropriate formula from the exemplary formulas depicted in fields 272, 273, 274, and 276 of FIG. 2b.

Step 416 includes using the mCTR to calculate a user-behavior click-through-rate (uCTR), which suggests whether a subsequent advertisement (e.g., 220) served with a subsequent webpage (e.g., webpage 212b) will be selected by the recipient-device user when the subsequent advertisement is evoked by the webpage keyword (e.g., KW2). For example, the mCTR that was calculated for KW2 might be used by uCTR calculator 281 to calculate a uCTR.

At step 418, an auction is conducted between the webpage keyword (e.g., KW2) and a current-webpage keyword (e.g., KW5), which is included among the text (e.g., 222a) of the subsequent webpage (e.g., webpage 212). For example, keyword evaluator 284a might compare KW2 and KW5 by applying one or more appropriate auction-ranking formulas as depicted in fields 294 and 291. Pursuant to method 410, a result of the auction is at least in part determined using the uCTR of the webpage keyword, and based on the result, the webpage keyword is used, instead of the current-webpage keyword, to evoke the subsequent advertisement, which is served to the recipient device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:
1. A computer-readable hardware memory device storing computer-executable instructions that, when executed, cause a computing device to perform a method of selecting an advertisement to be displayed on a webpage, the method comprising:

receiving the webpage that is to be served to a recipient device and that includes a fillable advertisement space, wherein the webpage includes a first keyword among content of the webpage;

retrieving a user-behavior click-through-rate (uCTR) of a second keyword, which was available to evoke a prior advertisement previously served to a user of the recipient device and is not included among the content of the webpage, wherein the uCTR quantifies a relevance of the second keyword to the user, and wherein the uCTR is calculated using a formula that mathematically combines a measured click-through-rate (mCTR) with a set of learned coefficients, the mCTR quantifying a contextual relevance of the second keyword to the user in a context of when the prior webpage was served to the user; and based at least in part on the uCTR, using the second keyword to evoke the advertisement instead of the first keyword, wherein the second keyword is not included among the content of the webpage and the first keyword is include among the content of the webpage.

2. Computer-readable hardware memory device of claim 1, wherein the uCTR suggests whether the advertisement served with the webpage will be selected by the user when the advertisement is evoked by the second keyword.

3. Computer-readable hardware memory device of claim 1, wherein the prior advertisement was served in a prior advertisement space of a prior webpage;

wherein the uCTR is calculated by applying a link function the mCTR, such that the uCTR quantifies a learned relevance of the second keyword to the user, and wherein the mCTR quantifies a contextual relevance of the second keyword to the user in a context of when the prior webpage was served to the user.

4. Computer-readable hardware memory device of claim 3, wherein the uCTR is determined using a formula represented by:

$$uCTR=(az+b)/(cz+d);$$

wherein z represents the mCTR of a pairing of the prior advertisement space and the second keyword; and wherein a, b, c, and d represent learned coefficients.

5. Computer-readable hardware memory device of claim 1, wherein the second keyword is available to evoke the prior advertisement when the second keyword is included among content of a prior webpage that was served to the user together with the prior advertisement.

6. Computer-readable hardware memory device of claim 1 further comprising, conducting an auction between the second keyword and the first keyword, wherein a first auction rank of the second keyword is equal to a product of a first bid and the uCTR, and wherein the first rank is more favorable than a second rank of the first keyword, such that, based at least in part on the uCTR, the second keyword is used to evoke the advertisement.

7. A method, which is facilitated by a processor and computer-readable media, of selecting an advertisement to be displayed on a webpage, the method comprising:

serving to a recipient device an initial webpage having an initial advertisement and a webpage keyword, which is included among text of the initial webpage, wherein the initial advertisement is served in an initial fillable advertisement space and is not evoked by the webpage keyword;

calculating by the processor a measured click-through-rate (mCTR) that quantifies a relevance of the webpage keyword to a recipient-device user in a context of when the initial webpage is served with the initial advertisement;

using the processor to calculate a user-behavior click-through-rate (uCTR) by applying a formula that mathematically combines the mCTR with a set of learned coefficients, the uCTR suggesting, whether a subsequent advertisement served with a subsequent webpage will be selected by the recipient-device user when the subsequent advertisement is evoked by the webpage keyword; and conducting by the processor an auction between the webpage keyword and a current-webpage keyword, which is included among the text of the subsequent webpage, wherein a result of the auction is at least in part determined using the uCTR of the webpage keyword, and wherein, based on the result, the webpage keyword is used, instead of the current-webpage keyword, to evoke the subsequent advertisement, which is served to the recipient-device user.

8. The method of claim 7, wherein, when the initial advertisement is evoked by the webpage keyword and the initial advertisement is not selected by the recipient-device user, the mCTR is represented by a first ratio: (SEL/IMP), SEL being a number of times an advertisement evoked by the webpage keyword is selected by any user of any recipient device when the advertisement is served in the initial fillable advertisement space, and IMP being a number of times the advertisement is served to any recipient device in the initial fillable advertisement space; and wherein, when the initial advertisement is not evoked by the webpage keyword, but the webpage keyword was a source usable to evoke an alternative advertisement, the mCTR is calculated using a first formula represented by: $mCTR=(SEL/IMP)*(IMP/SOU)^\alpha$, SOU being equal to the number of times the webpage keyword was a source to evoke the alternative advertisement, regardless of whether the alternative advertisement was served, and $\alpha$ being a parameter that is learned.

9. The method of claim 8, wherein, when the initial advertisement is not evoked by the webpage keyword and the webpage keyword was not a source to evoke the alternative advertisement, the mCTR is calculated using a second formula represented by: $mCTR=((SEL/IMP)*(IMP/SOU)^\alpha)*(SOU/TOT)^\beta$, wherein TOT is equal to a number of times the initial fillable advertisement space was served to any user of any recipient device, and wherein $\beta$ is a parameter that is learned.

10. The method of claim 7 further comprising, ranking the webpage keyword as a user keyword among other user keywords, wherein a keyword score of the user keyword is determined using the uCTR and wherein the keyword score is used to rank the user keyword.

11. The method of claim 10, wherein the keyword score comprises a product of the uCTR and a cost-per-click value of serving a given advertisement evoked by the user keyword.

12. The method of claim 11, wherein the keyword score comprises the product minus an expected opportunity cost of not serving a contextual advertisement on a given webpage.

13. The method of claim 7,
wherein the result is determined by assigning a respective auction rank to each of the webpage keyword and the current-webpage keyword,
wherein a first auction rank of the webpage keyword is equal to a product of a first bid and the uCTR, and
wherein the first auction rank is more favorable than a second auction rank of the current-webpage keyword, such that, based at least in part on the uCTR, the webpage keyword is used to evoke the subsequent advertisement.

14. The method of claim 13,
wherein the second auction rank is equal to a product of a second bid, a predicted click-through-rate (pCTR), and a measure of relevance of the current-webpage keyword to the subsequent webpage, and
wherein the pCTR quantifies a general relevance between the current-webpage keyword and a potential advertisement evoked by the current-webpage keyword, the general relevance not taking into account a relevance of the current-webpage keyword to the recipient-device user.

15. A system, which is employed using a processor and computer-readable media, that selects an advertisement to be displayed on a webpage, the system comprising:
a user-criteria database storing a user-associated criterion together with a user-behavior click-through-rate (uCTR),
wherein the user-associated criterion was available to evoke an initial advertisement that was previously served together with an initial webpage to a user, and
wherein the uCTR suggests whether a subsequent advertisement served with a subsequent webpage will be selected by the user when the subsequent advertisement is evoked by the user-associated criterion;
a criteria-stat generator that calculates the uCTR using a formula that mathematically combines a measured click-through-rate (mCTR) with a set of learned coefficients, the mCTR quantifying a relevance of the user-associated criterion to a recipient-device user in a context of when the initial webpage is served with the initial advertisement; and
a criteria evaluator that conducts an auction between the user-associated criterion and a current-webpage criteria, which is included in among content of the subsequent webpage.

16. The system of claim 15, wherein a value of the mCTR is dependent on whether the user-associated criterion was used to evoke the initial advertisement.

17. The system of claim 16, wherein, when the user-associated criterion was used to evoke the initial advertisement, the value of the mCTR is dependent on whether the initial advertisement was selected by the user.

* * * * *